United States Patent
Maruyama et al.

(10) Patent No.: US 8,532,900 B2
(45) Date of Patent: Sep. 10, 2013

(54) ACCELERATOR PEDAL DEVICE FOR VEHICLE AND PEDAL REACTION FORCE CONTROL METHOD

(75) Inventors: Kohei Maruyama, Utsunomiya (JP); Yutaka Horiuchi, Utsunomiya (JP); Takashi Yanagi, Sakura (JP); Hiroaki Sasaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/515,370

(22) PCT Filed: Jul. 6, 2011

(86) PCT No.: PCT/JP2011/065433
§ 371 (c)(1), (2), (4) Date: Jun. 12, 2012

(87) PCT Pub. No.: WO2012/039181
PCT Pub. Date: Mar. 29, 2012

(65) Prior Publication Data
US 2012/0253624 A1    Oct. 4, 2012

(30) Foreign Application Priority Data
Sep. 21, 2010 (JP) ................ 2010-211229

(51) Int. Cl.
*B60W 50/16* (2012.01)
*B60W 50/14* (2012.01)

(52) U.S. Cl.
USPC ............ 701/70; 701/71; 701/79; 701/110; 180/282

(58) Field of Classification Search
CPC . B60W 50/16; B60W 50/14; B60W 2540/10; B60W 2540/103
USPC .... 91/391 A; 123/370, 406.74; 192/111.12; 701/48, 70–71, 78–79, 110, 502; 180/90.6, 180/282, 370
See application file for complete search history.

(56) References Cited

U.S. PATENT DOCUMENTS

| | | | |
|---|---|---|---|
| 6,981,486 B2* | 1/2006 | Yone et al. | 123/399 |
| 7,076,358 B2* | 7/2006 | Egami | 701/70 |
| 2002/0161487 A1* | 10/2002 | Kojima et al. | 701/1 |
| 2003/0190996 A1* | 10/2003 | Yone | 477/120 |
| 2003/0236602 A1* | 12/2003 | Kuge et al. | 701/36 |
| 2005/0056253 A1* | 3/2005 | Yone et al. | 123/399 |
| 2005/0209743 A1* | 9/2005 | Egami | 701/1 |

(Continued)

FOREIGN PATENT DOCUMENTS

| | | |
|---|---|---|
| JP | 03-217627 | 9/1991 |
| JP | 2003-120339 | 4/2003 |

(Continued)

*Primary Examiner* — Mary Cheung
*Assistant Examiner* — Atul Trivedi
(74) *Attorney, Agent, or Firm* — Rankin, Hill & Clark LLP

(57) ABSTRACT

An accelerator pedal device for a vehicle, performing a pedal reaction force control method. The accelerator pedal device is provided with an engine speed detection unit that detects the engine speed (Ne) and a reaction force control unit that controls, on the basis of the engine speed (Ne), a pedal reaction force (Fr) applied by a reaction force application unit. The reaction force control unit limits the reduction ratio of the pedal reaction force (Fr) when the reduction ratio of the engine speed (Ne) is greater than or equal to a predetermined value.

6 Claims, 9 Drawing Sheets

(56) References Cited

U.S. PATENT DOCUMENTS

| | | | |
|---|---|---|---|
| 2009/0157274 A1* | 6/2009 | Park | 701/70 |
| 2009/0240404 A1* | 9/2009 | Matsuyawa | 701/50 |
| 2009/0281701 A1* | 11/2009 | Kargman | 701/70 |
| 2010/0139444 A1* | 6/2010 | Park | 74/513 |
| 2010/0250085 A1* | 9/2010 | Sugano et al. | 701/70 |
| 2010/0274459 A1* | 10/2010 | Suzaki et al. | 701/93 |
| 2010/0299037 A1* | 11/2010 | Sakaguchi et al. | 701/70 |
| 2011/0087414 A1* | 4/2011 | Shiomi et al. | 701/70 |
| 2011/0098900 A1* | 4/2011 | Shiomi et al. | 701/70 |
| 2011/0098901 A1* | 4/2011 | Shiomi et al. | 701/70 |

FOREIGN PATENT DOCUMENTS

| | | |
|---|---|---|
| JP | 2004-314871 | 11/2004 |
| JP | 2005-132225 | 5/2005 |
| JP | 2010-023731 | 2/2010 |
| JP | 2010-052722 | 3/2010 |
| JP | 2010-100071 | 5/2010 |

* cited by examiner

ACCELERATOR PEDAL DEVICE FOR VEHICLE AND PEDAL REACTION FORCE CONTROL METHOD

TECHNICAL FIELD

The present invention relates to a vehicular accelerator pedal apparatus (accelerator pedal device for vehicle) having a reaction force applying unit for applying a reaction force to an accelerator pedal, as well as to a pedal reaction force control method.

BACKGROUND ART

There has been known in the art a vehicular accelerator pedal apparatus for applying a reaction force to an accelerator pedal from an actuator such as a motor or the like to assist the driver in operating the vehicle (see Japanese Laid-Open Patent Publication No. 2004-314871, hereinafter referred to as "JP2004-314871A"). JP2004-314871A discloses an accelerator pedal stepping force control apparatus, which increases a stepping force (reaction force) on an accelerator pedal when the accelerator pedal is stepped on and as the engine rotational speed becomes higher (see claim 4).

SUMMARY OF INVENTION

According to JP2004-314871A, as the engine rotational speed becomes higher, the stepping force (reaction force) on the accelerator pedal when the accelerator pedal is stepped on is increased, as described above. However, when the transmission is shifted higher, the engine rotational speed sharply drops. For example, as shown in FIG. 9 of the accompanying drawings, when a vehicle (i.e., an automatic transmission vehicle in FIG. 9) is accelerated, the engine rotational speed [rpm] sharply drops as the transmission is shifted higher. If the driver keeps the accelerator pedal unchanged in position when the transmission is shifted higher, then the reaction force on the accelerator pedal is sharply reduced, which tends to make the driver feel strange with respect to the way in which the driver operates the accelerator pedal. This problem occurs not only when the transmission is shifted higher, but also when the engine rotational speed is lowered, such as when the vehicle starts to drive up a steep hill, for example.

The present invention has been made in view of the above drawbacks. It is an object of the present invention to provide a vehicular accelerator pedal apparatus and a pedal reaction force control method, which are capable of preventing the driver of a vehicle from experiencing a strange sensation with respect to the way in which the driver operates the accelerator pedal.

According to the present invention, there is provided a vehicular accelerator pedal apparatus having a reaction force applying unit for applying a pedal reaction force to an accelerator pedal of a vehicle, comprising an engine rotational speed detecting unit for detecting an engine rotational speed, and a reaction force control unit for controlling a pedal reaction force applied by the reaction force applying unit based on the engine rotational speed, wherein the reaction force control unit limits a reduction rate of the pedal reaction force when a reduction rate of the engine rotational speed is equal to or greater than a prescribed value.

According to the present invention, when the reduction rate of the engine rotational speed is equal to or greater than the prescribed value, the reduction rate of the pedal reaction force is limited. Therefore, even if the engine rotational speed is reduced while the accelerator pedal remains unchanged in position or is being depressed (by the driver in an unintended or unpredicted manner), for example, when the engine rotational speed is reduced at a time that the transmission is shifted higher or when the vehicle starts to drive up a steep hill, it is possible to prevent the pedal reaction force from being quickly reduced. Thus, the driver is prevented from experiencing a strange sensation due to a rapid reduction in the pedal reaction force.

The vehicular accelerator pedal apparatus may further comprise a pedal manipulated variable detecting unit for detecting a pedal manipulated variable of the accelerator pedal, wherein the reaction force control unit corrects the reduction rate of the pedal reaction force based on the pedal manipulated variable detected by the pedal manipulated variable detecting unit.

Since the reduction ratio of the pedal reaction force can be corrected based on the pedal manipulated variable, the pedal reaction force can be controlled more meticulously. In other words, since the driver's intention to accelerate and decelerate the vehicle, and the driver's intention to travel at a constant speed (i.e., to cruise) are determined depending on the operation of the accelerator pedal (pedal manipulated variable), it is possible to apply a pedal reaction force which is more attuned to the driver's intention by correcting the reduction rate of the pedal reaction force depending on the pedal manipulated variable. Based on operation of the accelerator pedal, if it is judged that the driver intends to decelerate the vehicle, for example, then the reduction ratio of the pedal reaction force is increased in order to reduce the pedal reaction force quickly, so that the pedal reaction force is prevented from remaining at a large value when the vehicle is accelerated next. Based on operation of the accelerator pedal, if it is judged that the driver intends to accelerate the vehicle, then the reduction ratio of the pedal reaction force is reduced in order to hinder a reduction in the pedal reaction force. The pedal reaction force thus keeps the driver in a highly attentive state of mind, thereby making it possible to prevent the driver from experiencing a strange sensation due to a quick reduction in the pedal reaction force.

The reaction force control unit may limit the reduction rate of the pedal reaction force less severely when the pedal manipulated variable detected by the pedal manipulated variable detecting unit is equal to or smaller than a second prescribed value for determining the driver's intention to finish accelerating the vehicle.

When the pedal manipulated variable is equal to or smaller than the second prescribed value, it is possible to limit the reduction rate of the pedal reaction force less severely, thereby quickly reducing the pedal reaction force. Generally, as the pedal manipulated variable becomes greater, it is more likely that the driver intends to accelerate the vehicle, whereas as the pedal manipulated variable become smaller, it is more likely that the driver intends to decelerate the vehicle. Furthermore, after the driver has decelerated the vehicle, often the driver will accelerate the vehicle again, or start to drive the vehicle at a constant speed. For accelerating the vehicle again or to start to drive the vehicle at a constant speed, the driver steps on the accelerator pedal again. At this time, if the pedal reaction force Fr is large, it may make the driver feel strange. According to the present invention, whether the driver intends to finish accelerating the vehicle or not is determined using the second prescribed value. If it is judged that the driver intends to finish accelerating the vehicle, then the pedal reaction force is reduced earlier, thus making the accelerator pedal ready for subsequent re-acceleration or for driving at a constant speed. Therefore, the driver can operate the accelerator pedal smoothly upon subsequent re-acceleration of the vehicle, or upon driving the vehicle at a constant speed.

The vehicular accelerator pedal apparatus may further comprise a transmission for transmitting rotational output power to road wheels from an engine at a speed reduction ratio based on a preset gear position, wherein the reaction force control unit limits the reduction rate of the pedal reaction force when the reduction rate of the engine rotational speed is equal to or greater than the prescribed value as the transmission is shifted higher.

Consequently, it is possible to prevent the pedal reaction force from being quickly reduced even if the engine rotational speed is reduced rapidly as the transmission is shifted higher in order to accelerate the vehicle. Thus, it is possible to prevent the driver from feeling strange concerning operation of the accelerator pedal at the time that the vehicle is accelerated.

The reaction force control unit may calculate a target engine rotational speed, as a target value for the engine rotational speed, from an output signal from the engine rotational speed detecting unit, and may limit the reduction rate of the pedal reaction force when a difference between the engine rotational speed acquired from the engine rotational speed detecting unit in a present cycle and the target engine rotational speed in a preceding cycle is smaller than a negative threshold value.

According to the present invention, there also is provided a method of controlling a pedal reaction force in a vehicular accelerator pedal apparatus having a reaction force applying unit for applying a pedal reaction force to an accelerator pedal, comprising the steps of detecting an engine rotational speed with an engine rotational speed detecting unit, controlling, with a reaction force control unit, a pedal reaction force applied by the reaction force applying unit based on the engine rotational speed, and limiting, with the reaction force control unit, a reduction rate of the pedal reaction force when a reduction rate of the engine rotational speed is equal to or greater than a prescribed value.

The vehicular accelerator pedal apparatus according to the present invention comprises the reaction force applying unit for applying a pedal reaction force to an accelerator pedal of the vehicle, and also includes the engine rotational speed detecting unit for detecting an engine rotational speed, and the reaction force control unit for controlling a pedal reaction force applied by the reaction force applying unit based on the engine rotational speed. The reaction force control unit temporarily limits a reduction rate of the pedal reaction force when the transmission of the vehicle is shifted higher.

According to the present invention, when the transmission is shifted higher, the reduction rate of the pedal reaction force is temporarily limited. Therefore, even if the engine rotational speed is reduced as a result of the transmission being shifted higher, the pedal reaction force is prevented from being quickly reduced, and hence the driver of the vehicle is prevented from experiencing a strange sensation due to a rapid reduction in the pedal reaction force.

DESCRIPTION OF EMBODIMENTS

A. Embodiment
1. Configuration of Vehicle 10

Figure 1:
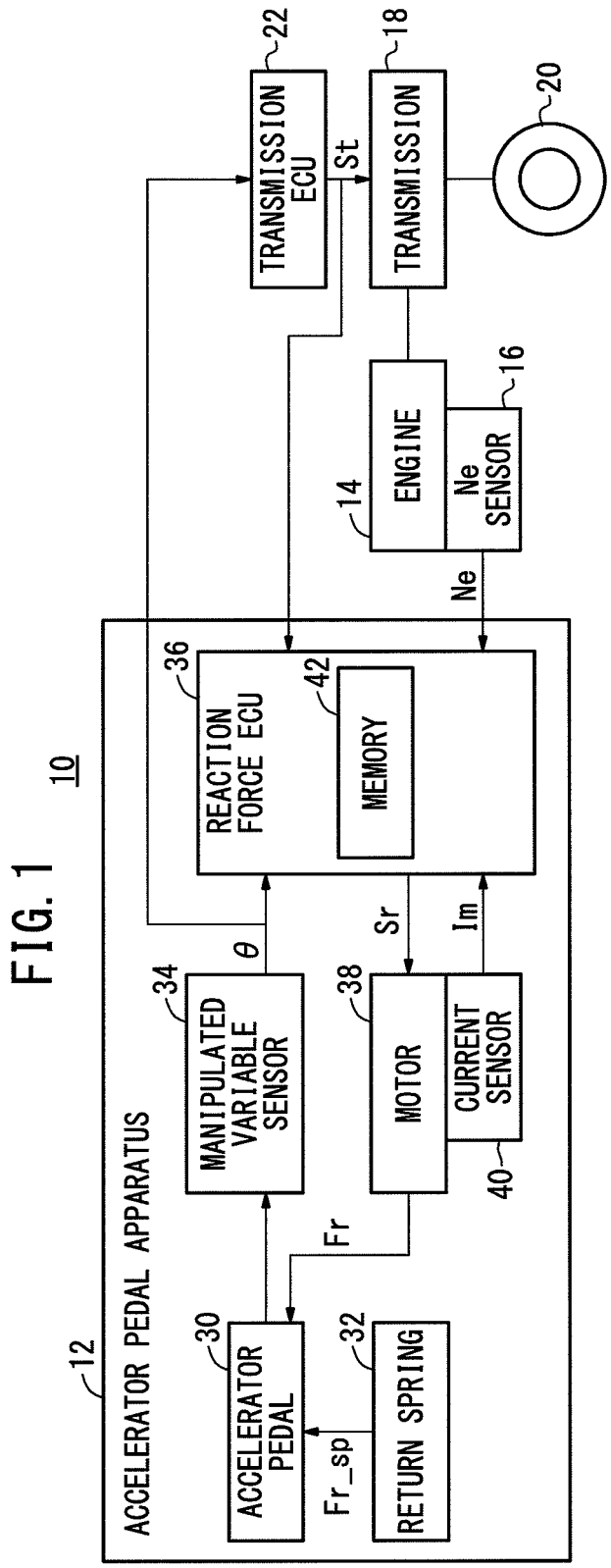
FIG. 1 is a block diagram of a vehicle incorporating therein a vehicular accelerator pedal apparatus according to an embodiment of the present invention.

FIG. 1 is a block diagram of a vehicle 10 incorporating therein a vehicular accelerator pedal apparatus 12 (hereinafter referred to as a "pedal apparatus 12") according to an embodiment of the present invention. The vehicle 10 comprises a four-wheel vehicle, for example. The vehicle 10 includes, in addition to the pedal apparatus 12, an engine 14, an engine rotational speed sensor 16 (hereinafter referred to as a "Ne sensor 16") for detecting an engine rotational speed Ne [rpm] of the engine 14, a transmission 18, road wheels 20, and a transmission electronic control unit 22 (hereinafter referred to as a "transmission ECU 22") for controlling the transmission 18.

The pedal apparatus 12 includes an accelerator pedal 30, a return spring 32 for applying a reaction force Fr_sp [N] to the accelerator pedal 30, a manipulated variable sensor 34, a reaction force electronic control unit 36 (hereinafter referred to as a "reaction force ECU 36"), a motor 38 for applying a reaction force (hereinafter referred to as a "pedal reaction force Fr") to the accelerator pedal 30, and a current sensor 40 (stepping force sensor).

The manipulated variable sensor 34 detects an amount of depression (pedal manipulated variable θ) [°] of the accelerator pedal 30 from an original position, and outputs the detected pedal manipulated variable θ to the transmission ECU 22 and the reaction force ECU 36.

The reaction force ECU 36 sets a target value for the pedal reaction force Fr (target reaction force Fr_tar) [N] depending on the engine rotational speed Ne detected by the Ne sensor 16, and sends a control signal Sr representative of the target reaction force Fr_tar to the motor 38.

The motor 38, which is connected to the accelerator pedal 30, applies a pedal reaction force Fr to the accelerator pedal 30 depending on the control signal Sr received from the reaction force ECU 36. Therefore, the accelerator pedal 30 receives the pedal reaction force Fr from the motor 38 in addition to the reaction force Fr_sp from the return spring 32. The motor 38 may be replaced by a different type of drive force generating means (e.g., a pneumatic actuator).

The current sensor 40 detects a current (motor current Im) [A] consumed by the motor 38 and indicates the detected current Im to the reaction force ECU 36. The motor current Im varies depending on the output power from the motor 38.

Therefore, the reaction force ECU 36 can determine the pedal reaction force Fr generated by the motor 38 based on the motor current Im.

The transmission 18 comprises an automatic transmission combined with a torque converter (not shown) for selecting a plurality of gear positions one at a time. The transmission ECU 22 controls the transmission 18 in order to select gear positions based on the pedal manipulated variable θ detected by the manipulated variable sensor 34. The transmission ECU 22 controls the transmission 18 using a control signal St.

2. Reaction Force Control

A process of controlling the reaction force Fr according to the present embodiment will be described below. Basically, according to the present embodiment, the reaction force Fr is controlled based on the engine rotational speed Ne.

Figure 2:
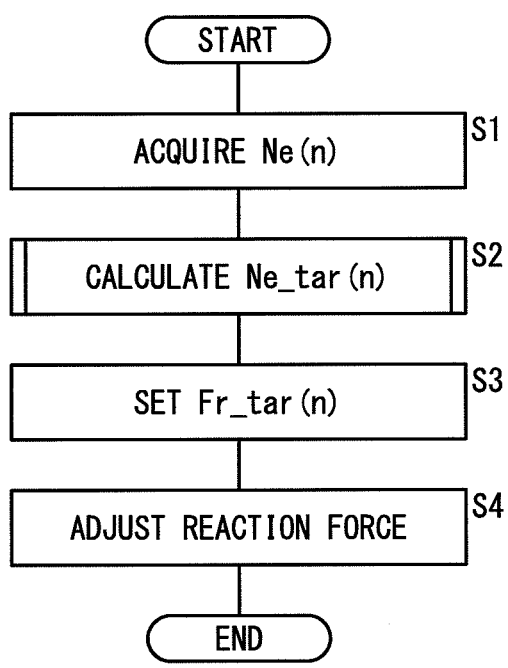
FIG. 2 is a flowchart of a processing sequence of a reaction force electronic control unit for controlling a pedal reaction force.

(1) Overall Flow Sequence:

FIG. 2 is a flowchart of a processing sequence of the reaction force ECU 36 for controlling the pedal reaction force Fr. In step S1, the reaction force ECU 36 acquires the engine rotational speed Ne from the Ne sensor 16. The engine rotational speed Ne acquired in the present processing cycle will hereinafter be referred to as an "engine rotational speed Ne(n)".

In step S2, the reaction force ECU 36 calculates a target value for the engine rotational speed Ne (hereinafter referred to as a "target engine rotational speed Ne_tar") based on the engine rotational speed Ne(n). The target engine rotational speed Ne_tar is a value used by the reaction force ECU 36, or stated otherwise, is a value used in order to control the pedal reaction force Fr. It should be noted that the target engine rotational speed Ne_tar is not used for fuel injection control for the engine 14 or the like.

The target engine rotational speed Ne_tar acquired in the present processing cycle will hereinafter be referred to as a "target engine rotational speed Ne_tar(n)", and the target engine rotational speed Ne_tar acquired in a preceding processing cycle will be referred to as a "target engine rotational speed Ne_tar(n−1)". A process of calculating the target engine rotational speed Ne_tar will be described later.

In step S3, the reaction force ECU 36 sets a target reaction force Fr_tar in the present cycle (hereinafter referred to as a "target reaction force Fr_tar(n)") based on the target engine rotational speed Ne_tar(n).

Figure 3:
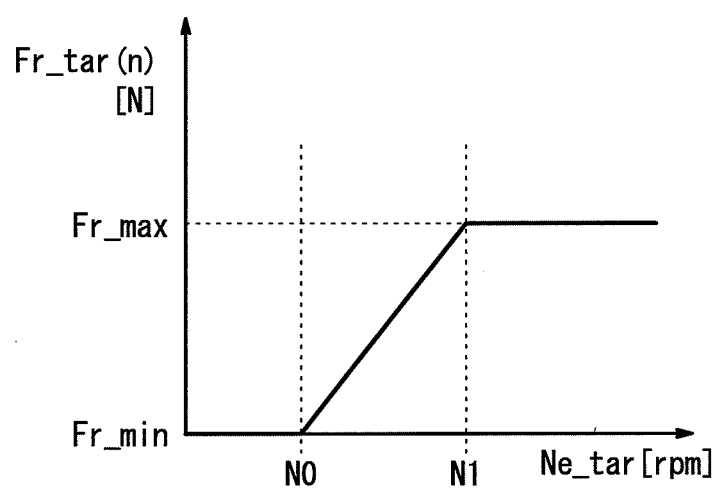
FIG. 3 is a diagram showing the relationship between a target engine rotational speed and a target reaction force.

FIG. 3 shows the relationship between the target engine rotational speed Ne_tar(n) and the target reaction force Fr_tar(n) (i.e., an output characteristic curve of the pedal reaction force Fr). As shown in FIG. 3, when the target engine rotational speed Ne_tar(n) is smaller than a prescribed threshold value N0, the target reaction force Fr_tar(n) remains at a minimum value Fr_min (e.g., zero). When the target engine rotational speed Ne_tar(n) lies within a range from the threshold value N0 to a threshold value N1, the target reaction force Fr_tar(n) increases according to a linear function in proportion to the target engine rotational speed Ne_tar(n). When the target engine rotational speed Ne_tar(n) exceeds the threshold value N1, the target reaction force Fr_tar(n) attains a maximum value Fr_max.

The relationship shown in FIG. 3 is represented by a map, which is stored in a memory 42 of the reaction force ECU 36.

In step S4, as shown in FIG. 2, the reaction force ECU 36 sends a control signal Sr to the motor 38, so as to control the output power of the motor 38 in order to equalize the pedal reaction force Fr generated by the motor 38 to the target reaction force Fr_tar(n).

The flow sequence shown in FIG. 2 is repeated as long as the pedal reaction force Fr continues to be generated.

Figure 4:
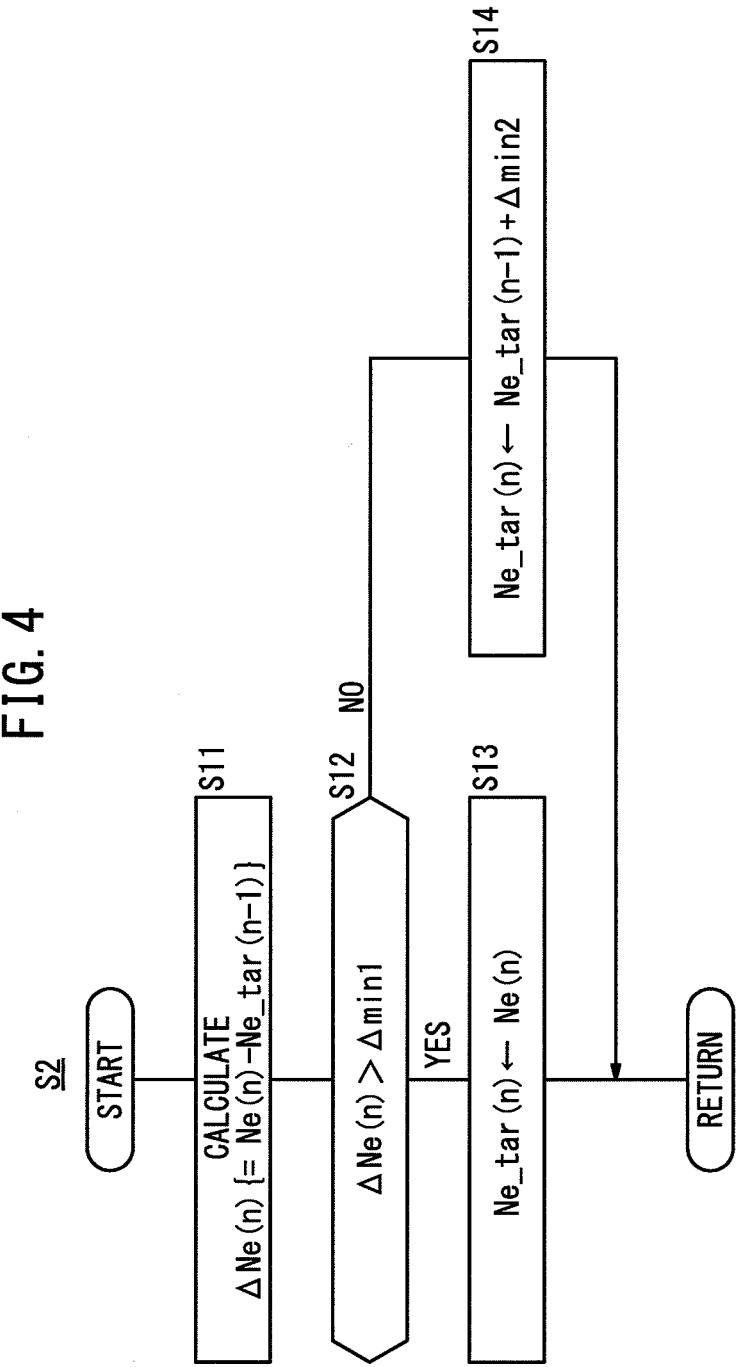
FIG. 4 is a flowchart of a processing sequence for calculating a target engine rotational speed.
Figure 5:
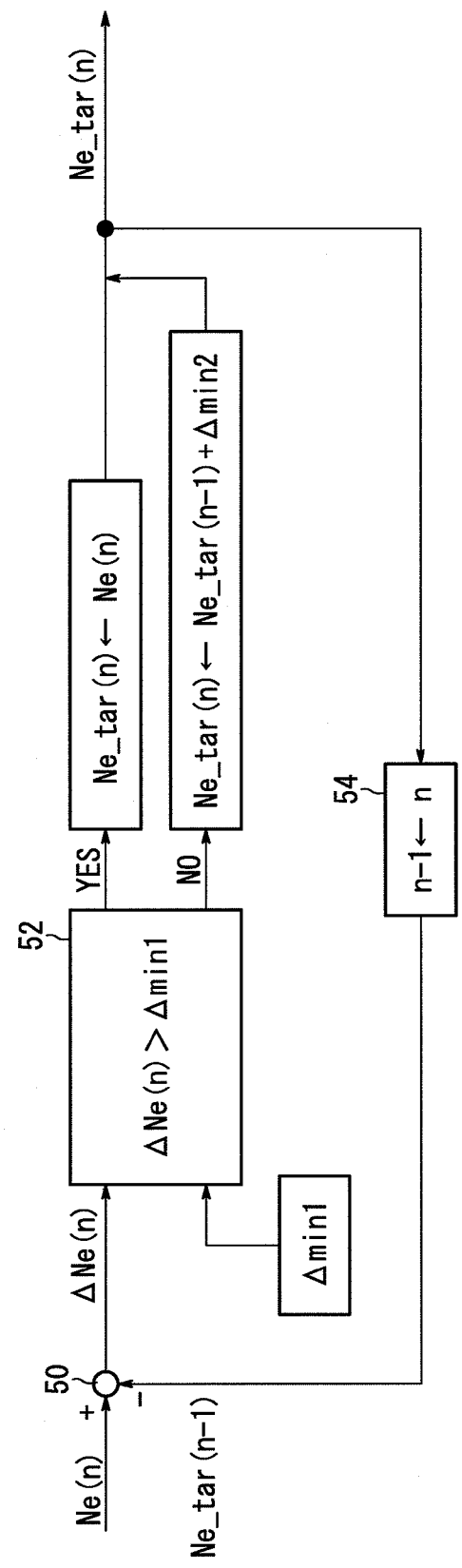
FIG. 5 is a block diagram of a hypothetical circuit configuration, which is representative of the processing sequence for calculating a target engine rotational speed.

(2) Calculation of Target Engine Rotational Speed Ne_tar(n):

FIG. 4 is a flowchart of a processing sequence for calculating the target engine rotational speed Ne_tar(n) (details of step S2 are shown in FIG. 2). FIG. 5 is a block diagram of a hypothetical circuit configuration, which is representative of a processing sequence for calculating the target engine rotational speed Ne_tar(n).

In step S11 shown in FIG. 4, the reaction force ECU 36 calculates the difference (hereinafter referred to as a "difference ΔNe(n)") between the engine rotational speed Ne(n) in the present cycle and an engine rotational speed Ne(n−1) in the preceding cycle. As shown in FIG. 5, a subtractor 50 calculates the difference ΔNe(n).

In step S12, the reaction force ECU 36 determines whether or not the difference ΔNe(n) has exceeded a threshold value Δmin1 [rpm]. As shown in FIG. 5, a comparator 52 makes such a determination. The threshold value Δmin1 is a negative threshold value (e.g., −500 rpm/sec) for determining a quick reduction in the engine rotational speed Ne, which is set to prevent the pedal reaction force Fr from undergoing an unintentional abrupt drop due to shifting up of the transmission or the like. For example, the threshold value Δmin1 is set to a difference ΔNe(n) or a value close thereto, which is produced due to shifting the transmission higher.

If the difference ΔNe(n) exceeds the threshold value Δmin1 (step S12: YES), then it is determined that the engine rotational speed Ne is either increasing, remains constant, or is gradually decreasing. Stated otherwise, the reduction rate at which the engine rotational speed Ne is reduced is equal to or smaller than a prescribed value. In step S13, the reaction force ECU 36 directly sets the engine rotational speed Ne(n) in the present cycle as the target engine rotational speed Ne_tar(n) in the present cycle (Ne_tar(n)←Ne(n)).

If the difference ΔNe(n) is equal to or smaller than the threshold value Δmin1 (step S12: NO), then it is determined that the engine rotational speed Ne is rapidly decreasing. Stated otherwise, the reduction rate of the engine rotational speed Ne is equal to or greater than the prescribed value. In step S14, the reaction force ECU 36 sets the sum of the engine rotational speed Ne(n−1) in the preceding cycle and a limiting value Δmin2 as the target engine rotational speed Ne_tar(n) in the present cycle (Ne_tar(n)←Ne_tar(n−1)+Δmin2). The limiting value Δmin2 is a negative setting value [rpm] for causing an unintentional drop in the pedal reaction force Fr to occur gradually. The limiting value Δmin2 may be the same value as the threshold value Δmin1, for example. When a drop in the target engine rotational speed Ne_tar is made to occur gradually in step S14, a drop in the target reaction force Fr_tar and the reaction force Fr can also be made to occur gradually. A control process for limiting a drop in the target reaction force Fr_tar is referred to as a "rate limiting control process".

The target engine rotational speed Ne_tar(n), which is set in step S13 or step S14, is used in step S3 shown in FIG. 2.

Although not shown in FIG. 4, the target engine rotational speed Ne_tar(n) in the present cycle is stored in the memory 42 (FIG. 1) for enabling calculation of a target engine rotational speed Ne_tar(n) in a next process, and is used as a target engine rotational speed Ne_tar(n−1) in the preceding cycle in the next process. As shown in FIG. 5, such a process is carried out by a delay unit 54.

3. Comparison with Comparative Example

Figure 6:
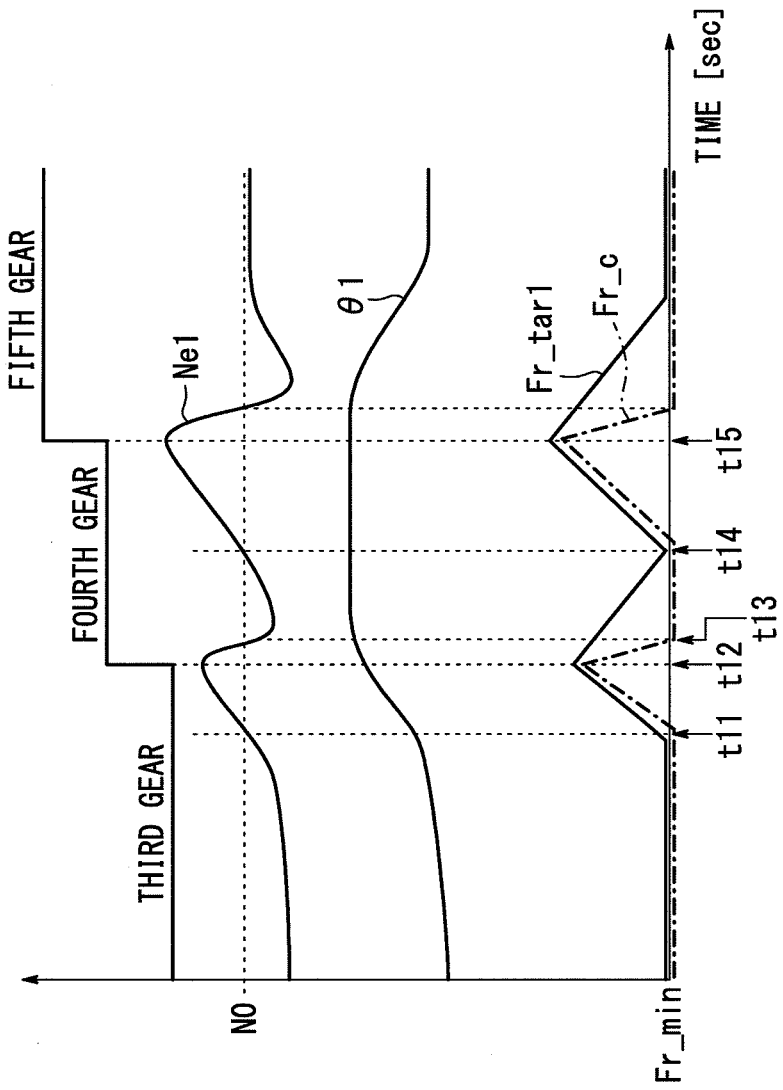
FIG. 6 is a timing chart showing, for purposes of comparison, a reaction force control process according to the embodiment and a reaction force control process according to a comparative example.

FIG. 6 is a timing chart showing, by way of comparison, a reaction force control process according to the present embodiment and a reaction force control process according to a comparative example. In FIG. 6, an engine rotational speed Ne1 (a measured value produced by the Ne sensor 16) and a manipulated variable θ1 of the accelerator pedal 30 are used commonly in both the present embodiment and the comparative example. In the comparative example, the rate limiting control process (step S14 in FIG. 4) according to the present embodiment is not used, but only the normal control process (step S13 in FIG. 4) is used. In the comparative example, furthermore, the relationship between the engine rotational speed Ne(n) and the target reaction force Fr_tar(n) in the normal control process shown in FIG. 3 is used. The target reaction force Fr_tar(n) used in the comparative example is expressed as a target reaction force Fr_c, whereas the target reaction force Fr_tar(n) used in the present embodiment is expressed as a target reaction force Fr_tar1, in order to distinguish the two target reaction forces from each other.

Up to time t11 in FIG. 6, since the engine rotational speed Ne1 is smaller than the threshold value N0, both the target reaction force Fr_tar1 in the present embodiment and the target reaction force Fr_c in the comparative example remain at the minimum value Fr_min (see FIG. 3).

After time t11, since the engine rotational speed Ne1 is equal to or greater than the threshold value N0, the target reaction force Fr_tar1 and the target reaction force Fr_c increase as the engine rotational speed Ne1 increases.

At time t12, the transmission 18 is shifted up from the third gear to the fourth gear, and thus the engine rotational speed Ne quickly drops. In the comparative example, since only the normal control process is used, the target reaction force Fr_c quickly decreases concurrently with the rapid decrease in the engine rotational speed Ne1. As a result, in the comparative example, the target reaction force Fr_c drops to the minimum value Fr_min at time t13.

On the other hand, in the present embodiment, since the rate limiting control process is used in addition to the normal control process, the target reaction force Fr_c decreases gradually even if the engine rotational speed Ne1 drops quickly. In the present embodiment, the target reaction force Fr_c reaches the minimum value Fr_min at time t14 after time t13.

At time t14, the target reaction force Fr_c reaches the minimum value Fr_min, and the engine rotational speed Ne1 exceeds the threshold value N0 again. Also at time t14, the difference ΔNe(n) becomes greater than the threshold value Δmin1 (step S12: YES in FIG. 4). In the present embodiment, therefore, the first rate limiting control process comes to an end at time t14.

After time t14, the engine rotational speed Ne1 is equal to or greater than the threshold value N0, and the difference ΔNe(n) remains greater than the threshold value Δmin1. Consequently, the target reaction force Fr_tar1 and the target reaction force Fr_c increase as the engine rotational speed Ne1 increases. Thereafter, at time t15, the same process is carried out when the transmission 18 is shifted up from the fourth gear to the fifth gear.

As shown in FIG. 6, the target reaction force Fr_tar1 decreases linearly from time t12 to time t14. If the threshold value Δmin1 is −500 rpm/sec, for example, then the rate limiting control process does not start, but the normal control process is performed immediately after time t12. The same process is carried out immediately after time t15.

4. Advantages of the Present Embodiment

According to the present embodiment, as described above, when the difference ΔNe(n) is equal to or smaller than the threshold value Δmin1 (step S12: NO in FIG. 4), the rate limiting control process (step S14) is carried out in order to limit the reduction rate of the pedal reaction force Fr. Therefore, even if the engine rotational speed Ne is reduced while the accelerator pedal 30 remains unchanged in position, or if the accelerator pedal 30 is being depressed (in an unintended or unpredicted manner by the driver), for example, when the engine rotational speed Ne is reduced at the time that the transmission 18 is shifted higher or when the vehicle starts to drive up a steep hill, it is possible to prevent the pedal reaction force Fr from being reduced rapidly. Thus, the driver is prevented from experiencing a strange sensation due to a rapid reduction in the pedal reaction force Fr.

According to the present embodiment, furthermore, when the transmission 18 is shifted higher, the rate limiting control process temporarily limits the reduction rate of the pedal reaction force Fr. Consequently, it is possible to prevent the pedal reaction force Fr from being rapidly reduced, even if the engine rotational speed Ne is reduced as the transmission 18 is shifted higher. It is thus possible to prevent the driver from experiencing a strange sensation due to a rapid reduction in the pedal reaction force Fr.

B. Modifications

The present invention is not limited to the above embodiment, but various alternative arrangements may be adopted based on the content of the present description. For example, the present invention may adopt the following alternative arrangements.

1. Vehicle 10

In the above embodiment, the vehicle 10 is an automatic transmission vehicle (AT vehicle). However, the vehicle 10 may also be a manual transmission vehicle (MT vehicle). The present invention also is applicable to electric vehicles (including hybrid vehicles and fuel cell vehicles) having a transmission that includes a plurality of preset gear positions.

2. Transmission 18

In the above embodiment, the transmission 18 is an automatic transmission combined with a torque converter. However, the transmission 18 is not limited to this type. The transmission 18 may be a continuously variable transmission (CVT) including a plurality of preset gear positions. The transmission 18 may also be a manual transmission (MT).

3. Calculation of Target Rotational Speed Ne_tar (Rate Limiting Control Process)

(1) Applications of Rate Limiting Control Process:

In the above embodiment, although the rate limiting control process is carried out when the difference ΔNe(n) is equal to or smaller than the threshold value Δmin1 (for example, when the transmission 18 is shifted higher), the rate limiting control process is not limited to this application. The rate limiting control process may be carried out only when the transmission 18 is shifted higher. For example, the reaction force ECU 36 may judge whether or not the transmission 18 has been shifted higher based on the control signal St, which is applied to the transmission 18 in order to change the gears. If the vehicle 10 is an MT vehicle, then the reaction force ECU 36 may judge whether or not the transmission 18 has been shifted higher based on an output signal from a gearshift position sensor (not shown).

(2) Difference ΔNe:

The above embodiment switches between the normal control process and the rate limiting control process using the difference ΔNe(n) between the engine rotational speed Ne(n) (measured value) in the present cycle and the target engine rotational speed Ne(n−1) (target value) in the preceding cycle (steps S12 through S14 in FIG. 4). However, switching between the normal control process and the rate limiting control process may be performed based on other numerical values. For example, switching between the control processes may be made by comparing the difference between the engine rotational speed Ne(n) (measured value) in the present cycle and the engine rotational speed Ne(n−1) (measured value) in the preceding cycle with a threshold value (i.e., a limiting value for changes, corresponding to the threshold value Δmin1). Alternatively, switching between the control processes may be made by comparing the difference between the reaction force Fr(n) (measured value) in the present cycle and the target reaction force Fr(n−1) (target value) in the preceding cycle, or the difference between the reaction force Fr(n) (measured value) in the present cycle and the reaction force Fr(n−1) (measured value) in the preceding cycle, with a threshold value (i.e., a limiting value for changes, corresponding to the threshold value Δmin1).

(3) Application Objects of Rate Limiting Control Process:

In the above embodiment, changes in the target reaction force Fr_tar and the reaction force Fr are limited by performing the rate limiting control process on the target engine rotational speed Ne_tar. However, the rate limiting control process is not limited to this application. The rate limiting control process may be performed directly on the target reaction force Fr_tar itself.

(4) Threshold Value Δmin1 and Limiting Value Δmin2:

(a) In the above embodiment, the threshold value Δmin1 (step S12 in FIG. 4) and the limiting value Δmin2 (step S14 in FIG. 4) in the rate limiting control process are each of one type (i.e., are fixed values). However, it is possible to use a plurality of threshold values Δmin1 as well as a plurality of limiting values Δmin2.

Figure 7:
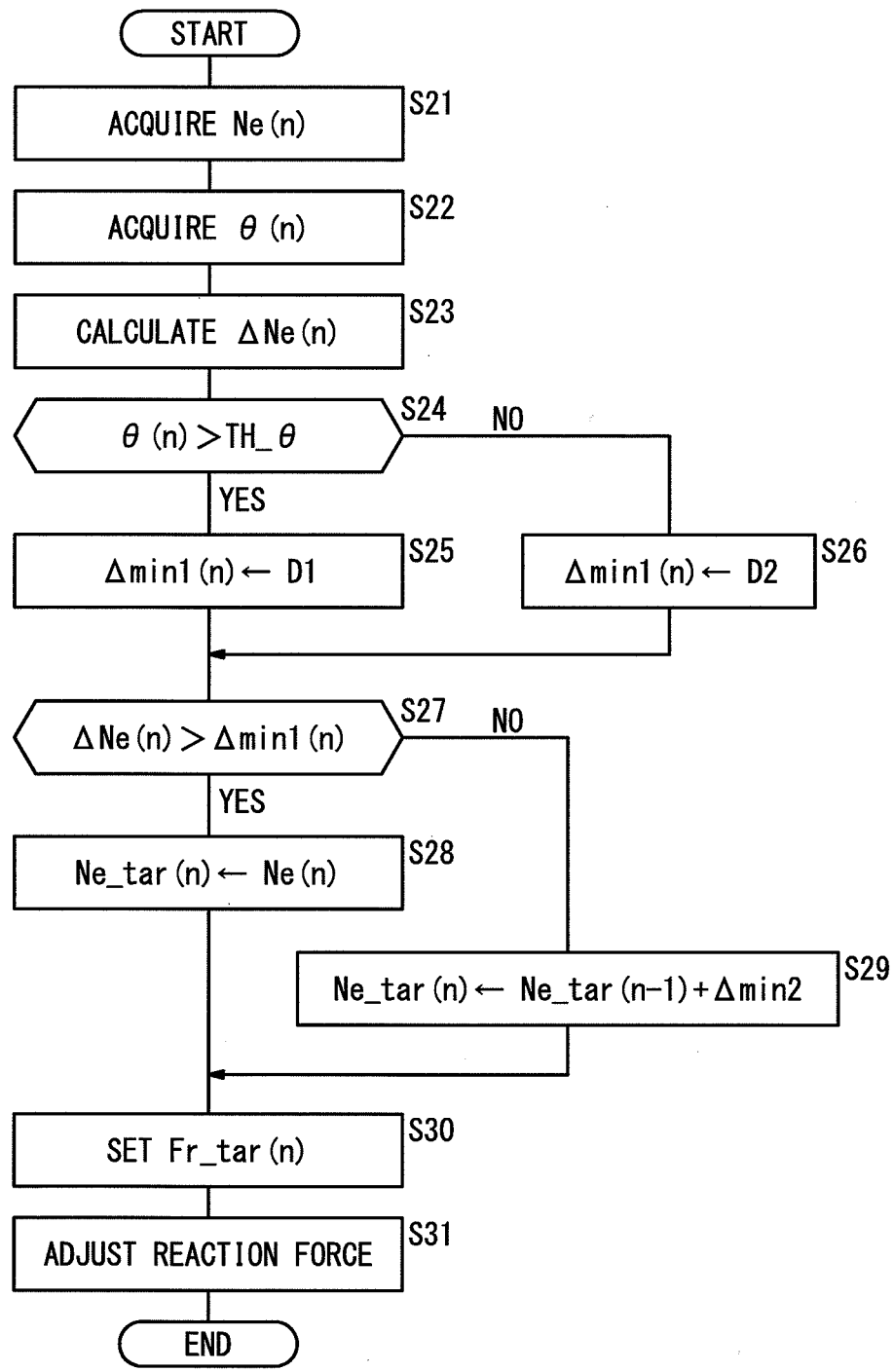
FIG. 7 is a flowchart of a control process (a combination of FIGS. 2 and 4) according to a modification of the embodiment.

FIG. 7 is a flowchart of a control process (a combination of FIGS. 2 and 4) according to a modified embodiment. According to the modification shown in FIG. 7, the threshold value Δmin1 serves as a variable, wherein a plurality of values can be set as the threshold value Δmin1.

Step S21 shown in FIG. 7 is the same as step S1 shown in FIG. 2. In step S22, the reaction force ECU 36 acquires a pedal manipulated variable θ to be used in the present cycle (hereinafter referred to as a "pedal manipulated variable θ(n)") from the manipulated variable sensor 34. Step S23 shown in FIG. 7 is the same as step S11 shown in FIG. 4.

In steps S24 through S26, a threshold value Δmin1 in the present cycle (hereinafter referred to as a "threshold value Δmin1(n)") is set. More specifically, in step S24, the reaction force ECU 36 judges whether or not the pedal manipulated variable θ(n) exceeds a threshold value in relation to the pedal manipulated variable θ (hereinafter referred to as a "threshold value TH_θ"). The threshold value TH_θ is a threshold value for determining that the driver intends to finish accelerating the vehicle (i.e., that the driver does not require additional acceleration).

If the pedal manipulated variable θ(n) exceeds the threshold value TH_θ (step S24: YES), then it can be determined that the driver intends to further accelerate the vehicle. In step S25, the reaction force ECU 36 sets a threshold value D1 as the threshold value Δmin1(n). The threshold value D1 may be the same value (e.g., −500 rpm/sec) as the threshold value Δmin1, which is a fixed value in the above embodiment (FIG. 4).

If the pedal manipulated variable θ(n) does not exceed the threshold value TH_θ (step S24: NO), then it can be determined that the driver does not intend to further accelerate the vehicle (stated otherwise, the driver intends to enter a cruise mode at the present vehicle speed, or to decelerate the vehicle). In step S26, the reaction force ECU 36 sets a threshold value D2 as the threshold value Δmin1(n). The threshold value D2 is a negative value (e.g., −10000 rpm/sec), the absolute value of which is greater than that of the threshold value D1 (|D2|>|D1|).

Steps S27 through S29 are the same as steps S12 through S14 shown in FIG. 4. However, the threshold value Δmin1(n) used in step S27, which is shown in FIG. 7, can be the threshold value D1 or the threshold value D2. If the threshold value D1 is the same as the threshold value Δmin1 (fixed value) in FIG. 4, then the threshold value D2 is a negative value, the absolute value of which is greater than the threshold value Δmin1 (fixed value). As a result, there is only a small possibility that the difference ΔNe(n) is smaller than the threshold value Δmin1(n) in step S27. Therefore, if the threshold value D2 is used as the threshold value Δmin1(n), the possibility for the rate limiting control process to be carried out is reduced. The limiting value Δmin2, which is used in step S29 in FIG. 7, need not necessarily be a fixed value, but may be varied together with the threshold value Δmin1(n).

Steps S30 and S31 are the same as steps S3 and S4 shown in FIG. 2.

Figure 8:
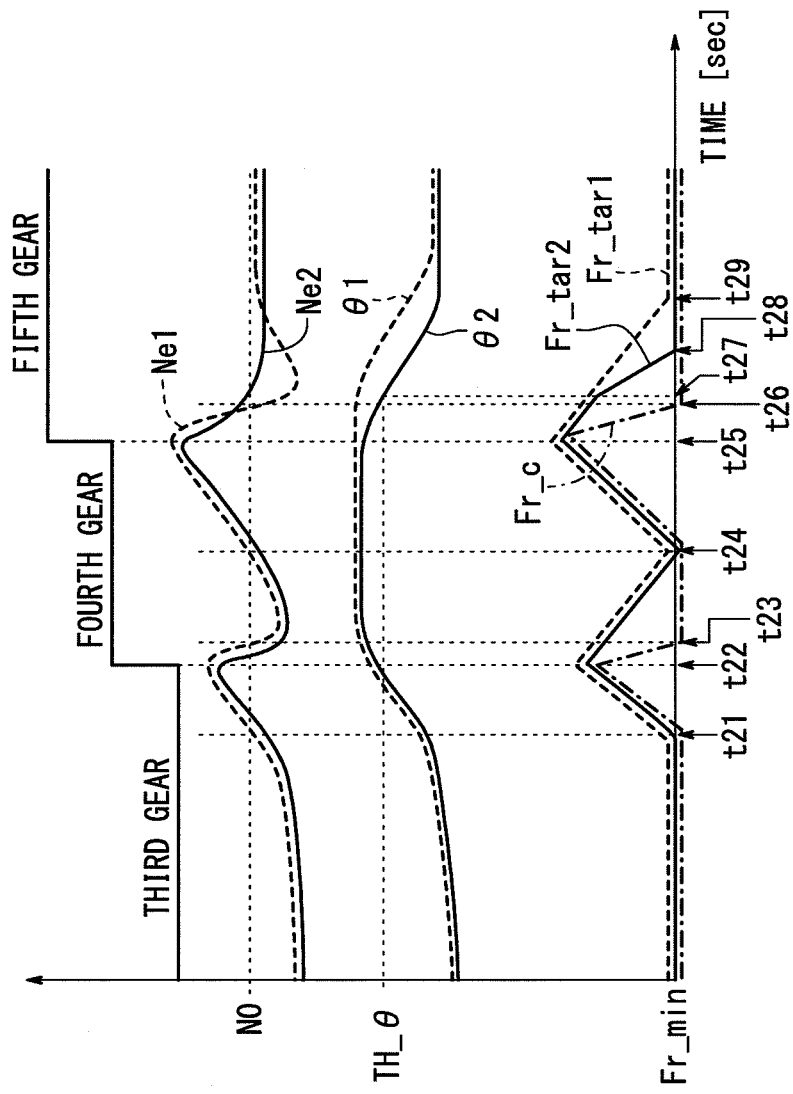
FIG. 8 is a timing chart showing, for purposes of comparison, reaction force control processes according to the embodiment and the comparative example, together with the reaction force control process shown in FIG. 7.
Figure 9:
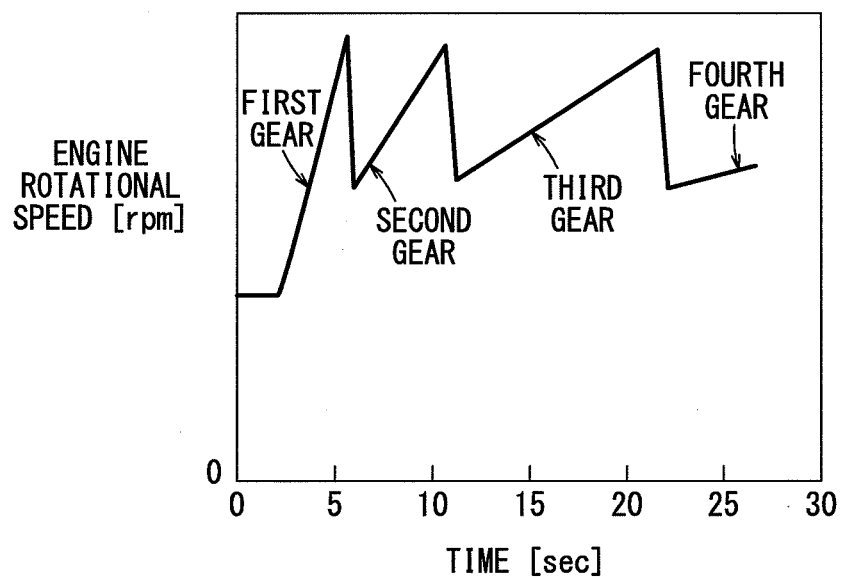
FIG. 9 is a diagram showing an example of speed change characteristics of an automatic transmission vehicle.

FIG. 8 is a timing chart showing, for purposes of comparison, respective reaction force control processes according to the present embodiment and the comparative example, as well as the reaction force control process shown in FIG. 7. In FIG. 8, the engine rotational speed Ne1 and the manipulated variable θ1 of the accelerator pedal 30 are the same as those shown in FIG. 6, and are commonly used both in the present embodiment and in the comparative example. In the present modification, the engine rotational speed Ne2 and the manipulated variable θ2 of the accelerator pedal 30 are used. The target reaction force Fr_tar in the present embodiment is expressed as a "target reaction force Fr_tar1", the target reaction force Fr_tar in the present modification is expressed as a "target reaction force Fr_tar2", and the target reaction force Fr_tar in the comparative example is expressed as a "target reaction force Fr_c", in order to distinguish the target reaction forces from each other.

The process carried out from time t21 to time t25 in FIG. 8 is the same as the process from time t11 to time t15 in FIG. 6, and thus, no basic differences are presented between the above embodiment and the present modification.

When the transmission 18 is shifted up from the fourth gear to the fifth gear at time t25, the engine rotational speeds Ne1, Ne2 quickly drop temporarily. As a result, the target reaction force Fr_c in the comparative example reaches the minimum value Fr_min at time t26.

According to the present modification, the driver gradually releases the accelerator pedal 30 after time t25, thereby gradually reducing the pedal manipulated variable θ2 until the pedal manipulated variable θ2 becomes equal to or smaller than the threshold value TH_θ at time t27 (step S24: NO in FIG. 7). Therefore, the threshold value Δmin1(n) used in the present modification switches from the threshold value D1 to the threshold value D2. As a consequence, after time t27, in the present modification, the reduction rate of the target reaction force Fr_tar2 is increased (the gradient is made steeper) compared with the target reaction force Fr_tar1 in the foregoing embodiment, and the target reaction force Fr_tar2 reaches the minimum value Fr min at time t28. As a result, according to the present modification, the target reaction force Fr_tar2 reaches the minimum value Fr_min earlier than the target reaction force Fr_tar1 in the foregoing embodiment, which reaches the minimum value Fr_min at time t29.

According to the modification shown in FIG. 7, as described above, the reaction force ECU 36 corrects the threshold value Δmin1(n) (the reduction ratio of the pedal reaction force Fr) based on the pedal manipulated variable θ (pedal manipulated variable θ2) which is detected by the manipulated variable sensor 34. Since the reduction ratio of the pedal reaction force Fr can be corrected based on the pedal manipulated variable θ, the pedal reaction force Fr can be controlled more meticulously. In other words, since the driver's intention to accelerate the vehicle, the driver's intention to decelerate the vehicle, and the driver's intention to travel at a constant speed (i.e., to cruise) are determined depending on operations of the accelerator pedal 30 (pedal manipulated variable θ), it is possible to apply a pedal reaction force Fr which is more attuned to the driver's intention by correcting the reduction rate of the pedal reaction force Fr depending on the pedal manipulated variable θ.

According to the modification shown in FIG. 7, when the pedal manipulated variable θ (pedal manipulated variable θ2), which is detected by the manipulated variable sensor 34, is equal to or smaller than the threshold value TH_θ, the reaction force ECU 36 uses the threshold value D2, the absolute value of which is greater than the threshold value D1, in order to limit the reduction rate of the pedal reaction force Fr less severely (i.e., to allow the pedal reaction force Fr to be reduced more abruptly).

Therefore, when the pedal manipulated variable θ is equal to or smaller than the threshold value TH_θ, it is possible to limit the reduction rate of the pedal reaction force Fr less severely, to thereby quickly reduce the pedal reaction force Fr. In general, as the pedal manipulated variable θ becomes greater, it is more likely that the driver intends to accelerate the vehicle, and as the pedal manipulated variable θ becomes smaller, it is more likely that the driver intends to decelerate the vehicle. Furthermore, after the driver has decelerated the vehicle, often the driver accelerates the vehicle again or begins to drive the vehicle at a constant speed. In order to accelerate the vehicle again, or for starting to drive the vehicle at a constant speed, the driver once again steps on the accelerator pedal 30. At this time, the driver feels strange if the pedal reaction force Fr is large. According to the present modification, using the threshold value TH_θ, it is determined whether or not the driver intends to finish accelerating the vehicle. If it is determined that the driver intends to finish accelerating the vehicle, then the pedal reaction force Fr is reduced earlier, so as to make the accelerator pedal 30 ready for subsequent re-acceleration or driving at a constant speed. Therefore, the driver can operate the accelerator pedal 30 smoothly during subsequent re-acceleration of the vehicle or upon driving the vehicle at a constant speed.

According to the above modification, the absolute value of the threshold value Δmin1(n) is increased when the pedal manipulated variable θ is equal to or smaller than the threshold value TH_θ. Conversely, the threshold value Δmin1(n) may be reduced when the pedal manipulated variable θ is equal to or greater than the threshold value TH_θ. The above modification switches between the threshold values D1 and D2 depending on the pedal manipulated variable θ. However, the threshold value Δmin1(n) may assume three or more different values. In such a case, the values of the pedal manipulated variable θ and the threshold value Δmin1(n) may be arranged as a map and stored for later use.

The driver's intention to finish accelerating the vehicle need not necessarily be determined based on the pedal manipulated variable θ, but may also be determined based on a reduction per unit time in the pedal manipulated variable θ (hereinafter referred to as a "reduction rate Δθ"). More specifically, a threshold value in relation to the reduction rate Δθ (hereinafter referred to as a "threshold value TH_Δθ") is established, such that when the reduction rate Δθ exceeds the threshold value TH_Δθ, it is determined that the driver intends to finish accelerating the vehicle, whereupon the absolute value of the threshold value Δmin1(n) is increased. Values of the reduction rate Δθ and the threshold value Δmin1 may be arranged as a map and stored for later use.

(b) In the above embodiment and in the above modification, the reduction rate of the target engine rotational speed Ne_tar is limited using the limiting value Δmin2 [rpm] as a certain value for the engine rotational speed Ne. However, the reduction rate of the target engine rotational speed Ne_tar may be limited in other ways. For example, the target engine rotational speed Ne_tar(n) in the present cycle may be limited such that the target engine rotational speed Ne_tar(n) is not made smaller than the product of the target engine rotational speed Ne_tar(n−1) in the preceding cycle and a coefficient α (0<α<1). Such a method may also be used when the reduction ratio of the target reaction force Fr_tar, rather than the target engine rotational speed Ne_tar, is limited directly.

The invention claimed is:

1. A vehicular accelerator pedal apparatus having a reaction force applying unit for applying a pedal reaction force to an accelerator pedal of a vehicle, comprising:
    an engine rotational speed detecting unit for detecting an engine rotational speed; and
    a reaction force control unit for controlling a pedal reaction force applied by the reaction force applying unit based on the engine rotational speed,
    wherein the reaction force control unit limits a reduction rate of the pedal reaction force when a reduction rate of the engine rotational speed is equal to or greater than a prescribed value.

2. The vehicular accelerator pedal apparatus according to claim 1, further comprising:
    a pedal manipulated variable detecting unit for detecting a pedal manipulated variable of the accelerator pedal,
    wherein the reaction force control unit corrects the reduction rate of the pedal reaction force based on the pedal manipulated variable detected by the pedal manipulated variable detecting unit.

3. The vehicular accelerator pedal apparatus according to claim 2, wherein the reaction force control unit limits the reduction rate of the pedal reaction force less severely when the pedal manipulated variable detected by the pedal manipulated variable detecting unit is equal to or smaller than a second prescribed value for determining a driver's intention to finish accelerating the vehicle.

4. The vehicular accelerator pedal apparatus according to claim 1, further comprising:
    a transmission for transmitting rotational output power to road wheels from an engine at a speed reduction ratio based on a preset gear position,
    wherein the reaction force control unit limits the reduction rate of the pedal reaction force when the reduction rate of the engine rotational speed is equal to or greater than the prescribed value as the transmission is shifted higher.

5. The vehicular accelerator pedal apparatus according to claim 1, wherein the reaction force control unit:
    calculates a target engine rotational speed, as a target value for the engine rotational speed, from an output signal from the engine rotational speed detecting unit; and
    limits the reduction rate of the pedal reaction force when a difference between the engine rotational speed acquired from the engine rotational speed detecting unit in a present cycle and the target engine rotational speed in a preceding cycle is smaller than a negative threshold value.

6. A method of controlling a pedal reaction force in a vehicular accelerator pedal apparatus having a reaction force applying unit for applying a pedal reaction force to an accelerator pedal, comprising the steps of:
    detecting an engine rotational speed with an engine rotational speed detecting unit;

controlling, with a reaction force control unit, a pedal reaction force applied by the reaction force applying unit based on the engine rotational speed; and limiting, with the reaction force control unit, a reduction rate of the pedal reaction force when a reduction rate of the engine rotational speed is equal to or greater than a prescribed value.

\* \* \* \* \*